(12) United States Patent
Hata

(10) Patent No.: US 9,559,836 B1
(45) Date of Patent: Jan. 31, 2017

(54) CLOCK DATA RECOVERY CIRCUIT

(71) Applicant: Renesas Electronics Corporation, Tokyo (JP)

(72) Inventor: Katsuhiko Hata, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

(21) Appl. No.: 15/218,005

(22) Filed: Jul. 23, 2016

(30) Foreign Application Priority Data

Aug. 31, 2015 (JP) ................................ 2015-170091

(51) Int. Cl.
*H03D 3/24* (2006.01)
*H04L 7/033* (2006.01)

(52) U.S. Cl.
CPC ........... *H04L 7/0337* (2013.01); *H04L 7/0331* (2013.01); *H04L 7/0332* (2013.01)

(58) Field of Classification Search
None
See application file for complete search history.

(56) References Cited

U.S. PATENT DOCUMENTS

| | | | |
|---|---|---|---|
| 8,139,704 B2 * | 3/2012 | Heinrich | H03L 7/0805 327/156 |
| 8,537,955 B1 * | 9/2013 | Keane | H03L 7/0807 327/156 |
| 2010/0171535 A1 * | 7/2010 | Shanan | H03L 7/1976 327/157 |
| 2014/0192935 A1 * | 7/2014 | Palusa | H04L 7/033 375/340 |

FOREIGN PATENT DOCUMENTS

| | | |
|---|---|---|
| EP | 1 137 187 A2 | 9/2001 |
| JP | 2001-202721 A | 7/2001 |

* cited by examiner

*Primary Examiner* — Tesfaldet Bocure
(74) *Attorney, Agent, or Firm* — McGinn IP Law Group, PLLC

(57) ABSTRACT

In a clock data recovery circuit according to related art, it is difficult to achieve a high responsiveness. According to one embodiment, a clock data recovery circuit includes a loop filter, the loop filter including a first path (121, 122) that determines a loop gain that sets a speed of adjusting a phase of a recovery clock to a phase of an input signal, a second path (123, 124) that determines a frequency tracking gain that sets a speed of adjusting a frequency of the recovery clock to a frequency of the input signal, and a compensator 130 that gives a negative feedback from an output side to an input side of the first path and compensates for a phase delay of an output of a phase detector due to a delay amount of the loop filter.

9 Claims, 11 Drawing Sheets

CLOCK DATA RECOVERY CIRCUIT

CROSS-REFERENCE TO RELATED APPLICATIONS

This application is based upon and claims the benefit of priority from Japanese patent application No. 2015-170091, filed on Aug. 31, 2015, the disclosure of which is incorporated herein in its entirety by reference.

BACKGROUND

The present invention relates to a clock data recovery circuit and relates to, for example, a clock data recovery circuit that receives a signal on a transmission line in which a clock is superimposed on data and separates the clock from the data.

In a serial data communication such as PCI express (registered trademark), a signal in which a clock is superimposed on data is used as a transmission signal. Therefore, in the serial data communication, a clock data recovery circuit is used to separate the clock from the data of a reception signal in a reception side. This clock data recovery circuit includes a phase detector that detects a phase difference between an input signal and the clock and extracts data from the input signal, a loop filter that generates a phase control signal from the phase difference detected in the phase detector, and a phase shifter that controls the phase of the clock based on the phase control signal.

In recent years, in accordance with an increase in the communication speed of the serial data communication, a phase delay of an output of the phase detector due to a latency of the loop filter of the clock data recovery circuit has become a problem. One example of techniques for compensating for the latency of the loop filter is disclosed in Japanese Unexamined Patent Application Publication No. 2001-202721.

Japanese Unexamined Patent Application Publication No. 2001-202721 discloses an example of the loop filter mounted on a PLL circuit. The PLL circuit disclosed in Japanese Unexamined Patent Application Publication No. 2001-202721 includes a latency compensation circuit based on the Smith method. More specifically, the loop filter circuit disclosed in Japanese Unexamined Patent Application Publication No. 2001-202721 includes an input circuit that receives a phase signal corresponding to a change in phases and an actual phase signal corresponding to an actual phase sampling of a sampling clock, a filter circuit that connects the phase signal and the actual phase signal to a phase update signal, and a feedback circuit that eliminates loop latency by feeding back to the filter circuit a part of the phase update signal.

SUMMARY

In the technique disclosed in Japanese Unexamined Patent Application Publication No. 2001-202721, however, a constant number needs to be set with a high accuracy, whereby the size of the circuit increases. When the size of the circuit increases, the delay amount in the circuit increases. However, since data is transmitted intermittently in the clock data recovery circuit, when the delay amount increases, it may be impossible to correctly receive data. That is, since a high responsiveness is required in the clock data recovery circuit compared to the PLL circuit, the loop filter disclosed in Japanese Unexamined Patent Application Publication No. 2001-202721 cannot be applied to the clock data recovery circuit.

The other problems of the related art and the novel characteristics of the present invention will be made apparent from the descriptions of the specification and the accompanying drawings.

According to one exemplary embodiment, a clock data recovery circuit includes a loop filter, the loop filter including a first path that determines a loop gain that sets a speed of adjusting a phase of a recovery clock to a phase of an input signal, a second path that determines a frequency tracking gain that sets a speed of adjusting a frequency of the recovery clock to a frequency of the input signal, and a compensator that gives a negative feedback from an output side to an input side of the first path and compensates for a phase delay of an output of a phase detector due to a delay amount of the loop filter.

According to the embodiment, the clock data recovery circuit is able to achieve a high responsiveness.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
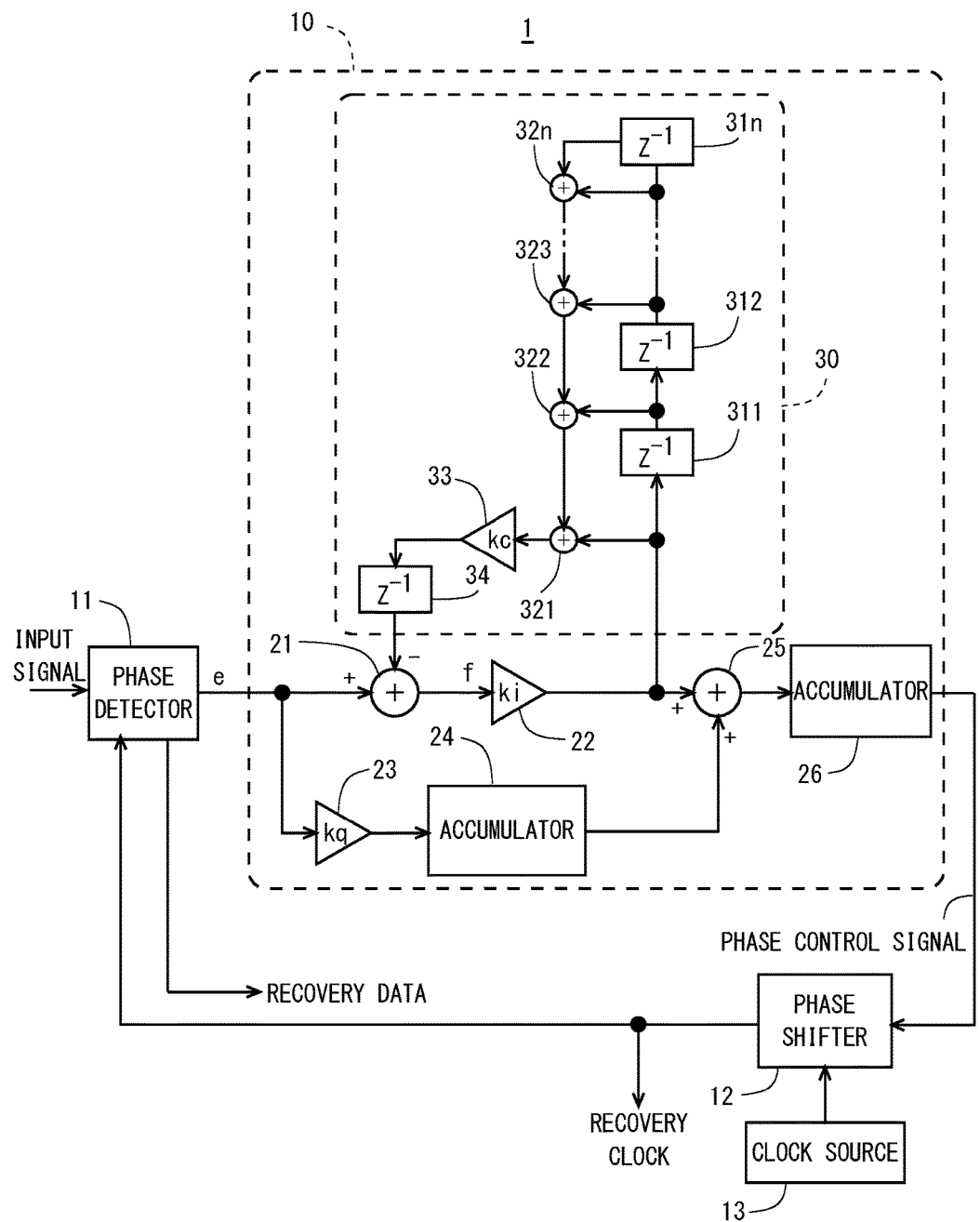
FIG. 1 is a specific block diagram of a clock data recovery circuit according to a first embodiment.

For the clarification of the description, the following description and the drawings may be omitted or simplified as appropriate. Further, each element shown in the drawings as functional blocks that perform various processing can be formed of a CPU, a memory, and other circuits in hardware and may be implemented by programs loaded in the memory in software. Those skilled in the art will therefore understand that these functional blocks may be implemented in various ways by only hardware, only software, or the combination thereof without any limitation. Throughout the drawings, the same components are denoted by the same reference symbols and overlapping descriptions will be omitted as appropriate.

Further, the above program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

In the following description, an example in which a clock data recovery circuit 1 according to a first embodiment is implemented in a circuit (hardware including a predetermined element) will be described. FIG. 1 shows a specific block diagram of the clock data recovery circuit 1 according to the first embodiment.

As shown in FIG. 1, the clock data recovery circuit 1 according to the first embodiment includes a loop filter 10, a phase detector 11, a phase shifter 12, and a clock source 13. Further, the phase detector 11 receives a transmission signal in which a clock is superimposed on data as an input signal. The loop filter 10 outputs a phase control signal that indicates the magnitude of a phase error according to a phase difference signal e between recovery data of the phase detector 11 and a recovery clock.

The phase detector 11 detects a phase difference between the recovery clock and the input signal and outputs the phase difference signal e that indicates the phase difference. This phase difference signal e indicates at least a difference between a phase advancement and a phase delay of the recovery clock with respect to the input signal. While the detail of the phase detector 11 will be described later, the phase detector 11 uses a Bang-Bang Phase Detector or the like that outputs only information regarding whether the phase is advanced or is delayed. The phase detector 11 according to the first embodiment outputs a first signal and a second signal as the phase difference signal e, the first signal being a binary signal and expressing the phase advancement and the second signal being a binary signal and expressing the phase delay.

The loop filter 10 generates the phase control signal based on the phase difference detected by the phase detector (e.g., value indicated by the phase difference signal e). Then the phase shifter 12 controls the phase of the recovery clock based on the phase control signal. More specifically, the phase shifter 12 receives a clock from the clock source 13 and controls the phase of the clock that the phase shifter 12 has received based on the phase control signal. While the phase shifter 12 and the clock source 13 have been separately provided in the example shown in FIG. 1, a PLL circuit that directly controls the phase of the clock generated by the clock source may be used as the phase shifter 12 and the clock source 13.

Now, the loop filter 10 will be described in detail. As shown in FIG. 1, the loop filter 10 includes a subtractor 21, a first amplifier (e.g., amplifier 22), a second amplifier (e.g., amplifier 23), a second accumulator (e.g., accumulator 24), a third accumulator (e.g., accumulator 26), an adder 25, and a compensator 30. The compensator 30 further includes delay circuits 311 to 31$n$ ($n$ is an integer indicating the number of elements, the same is applied to the following description), adders 321 to 32$n$, an amplifier in the compensator (e.g., amplifier 33), and a delay circuit 34. A first accumulator is composed of the delay circuits 311 to 31$n$ and the adders 321 to 32$n$ and the detail thereof will be described later.

The compensator 30 gives a negative feedback from an output side to an input side of a first path that will be described later and compensates for the phase delay of the output of the phase detector due to a delay amount of the loop filter. More specifically, the compensator 30 gives an output to the other input of the subtractor 21 on the first path, to thereby give the negative feedback from the output side to the input side of the first path and compensates for the phase delay of the output of the phase detector due to the delay amount of the loop filter. The compensator 30 outputs a first accumulated value in which output values of the first path for n cycles before the present time are accumulated. The first accumulated value output from the compensator 30 is a value obtained by amplifying the value in which the output values of the first path for the n cycles before the present time are accumulated by an amplification factor kc. Further, the number of cycles for which the output values of the first path are accumulated in the compensator 30 has a magnitude corresponding to a loop delay time of the clock data recovery circuit 1.

In the compensator 30, the delay circuits 311 to 31$n$ hold the output values of the first path for the n cycles before the present time and the adders 321 to 32$n$ generate a preliminary accumulated value in which the output values of the first path for n cycles before the present time are accumulated. That is, in the compensator 30, the amplifier 33 amplifies the preliminary accumulated value output from the adder 321 by the amplification factor kc, to thereby generate the first accumulated value. That is, in the compensator 30, the delay circuits 311 to 31$n$ and the adders 321 to 32$n$ constitute the first accumulator. Then the first accumulated value output from the amplifier 33 is held in the delay circuit 34 and the first accumulated value held in the delay circuit 34 is output to the subtractor 21.

In the loop filter 10, the first path is composed of the subtractor 21 and the amplifier 22. The first path is a path that has an input side to which the phase difference signal is input, determines a loop gain which sets a speed of adjusting the phase of the recovery clock to the phase of the input signal, and has an output side from which a first output value is output. The subtractor 21 is provided in an input side on the first path and receives the phase difference signal e as one input. Specifically, the subtractor 21 outputs a value f obtained by subtracting the first accumulated value output from the compensator 30 from the phase difference indicated by the phase difference signal e. The amplifier 22 amplifies the value f by an amplification factor ki and outputs the amplified value to the adder 25. The loop gain is set by the product of the amplification factor ki of the amplifier 22 and the amplification factor kc of the amplifier 33 in the compensator 30 described later.

Further, in the loop filter 10, a second path is composed of the amplifier 23 and the accumulator 24. The second path receives the phase difference signal e and determines a frequency tracking gain which sets the speed of adjusting the frequency of the recovery clock to the frequency of the input signal. The amplifier 23 amplifies the phase difference indicated by the phase difference signal e by an amplification factor kq and outputs the amplified value. The accumulator 24 accumulates the value output from the amplifier 23 and outputs a second accumulated value.

In the loop filter 10, the adder 25 adds the output value of the amplifier 22 and the second accumulated value output from the accumulator 24. The value output from the adder 25 is accumulated in the accumulator 26. The loop filter 10 outputs the value accumulated in the accumulator 26 as the phase control signal.

That is, the clock data recovery circuit 1 according to the first embodiment includes the phase detector 11 that detects the phase difference between the recovery clock and the input signal and outputs the phase difference signal e that indicates the phase difference, the loop filter 10 that generates the phase control signal based on the phase difference signal e, and the phase shifter 12 that controls the phase of the recovery clock based on the phase control signal. The loop filter 10 includes the first path at least including the first subtractor (e.g., subtractor 21) having one input on the path to which the phase difference signal e is input, the second path that receives the phase difference signal e and is arranged in parallel with the first path, the adder 25 that adds the first output value output from the first path and the second output value output from the second path and outputs the obtained value, and the compensator 30 that is connected between the output node of the first path from which the first output value is output and the other input of the subtractor 21 and forms the feedback path for the first path.

Further, the compensator 30 includes the first accumulator (e.g., delay circuits 311 to 31n and adders 321 to 32n) that accumulates the first output value output from the first path and outputs the preliminary accumulated value, the amplifier 33 that amplifies the preliminary accumulated value and generates the first output value, and the delay circuit 34 that holds the first accumulated value. The first path includes the amplifier 22 that is provided subsequent to the subtractor 21 and outputs the first output value. The second path includes the amplifier 23 that amplifies the phase difference signal e and the accumulator 24 that accumulates the output value of the amplifier 23 and outputs the second output value.

Note that the loop filter 10 can be implemented in various forms such as numerical operation processing by a Digital Signal Processor (DSP) or hardware using a circuit element according to each function.

Figure 2:
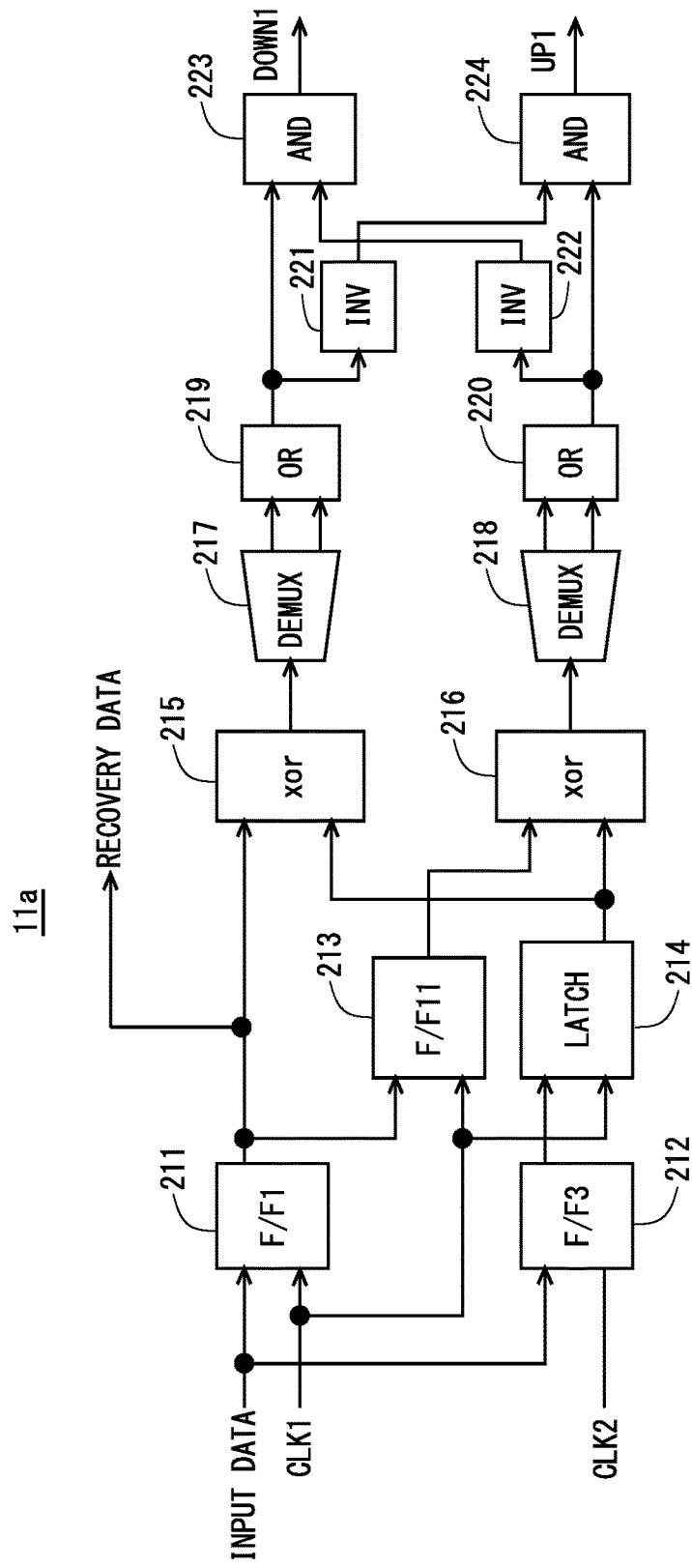
FIG. 2 is a first example of a block diagram of a phase detector according to the first embodiment.
Figure 3:
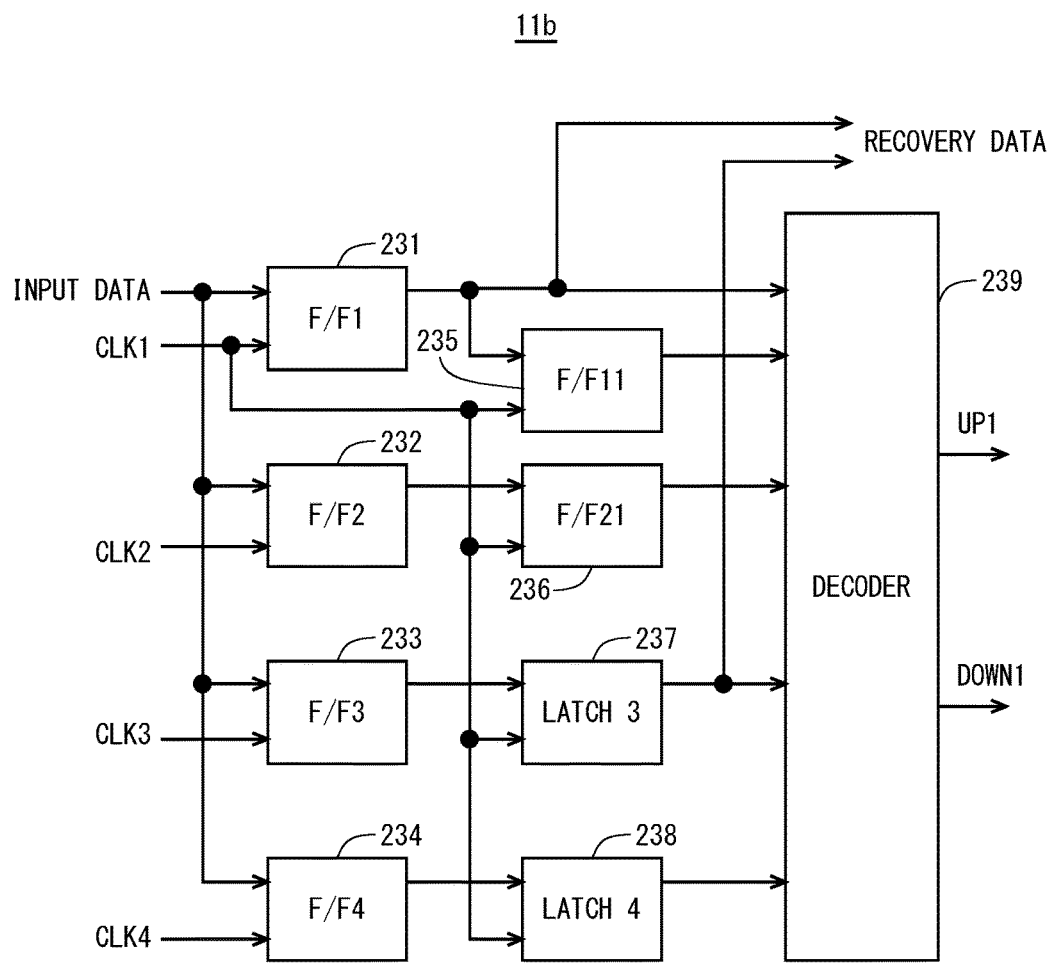
FIG. 3 is a second example of the block diagram of the phase detector according to the first embodiment.

Now, the phase detector 11 according to the first embodiment will be described in detail. As stated above, the phase detector 11 outputs the first signal and the second signal as the phase difference signal e, the first signal being a binary signal and expressing the phase advancement and the second signal being a binary signal and expressing the phase delay. FIG. 2 shows a first example of a block diagram of a phase detector 11a according to the first embodiment. FIG. 3 shows a second example of a block diagram of a phase detector 11b according to the first embodiment.

The phase detector 11a shown in FIG. 2 is one example of a configuration in which data of 1.5 Gbps is received using two-phase 1.5-GHz clock signals. The phase detector 11a shown in FIG. 2 includes a first flip-flop 211, a second flip-flop 212, a third flip-flop 213, a latch 214, a first XOR circuit 215, a second XOR circuit 216, a first demultiplexer 217, a second demultiplexer 218, a first OR circuit 219, a second OR circuit 220, a first inverter 221, a second inverter 222, a first AND circuit 223, and a second AND circuit 224. Further, the phase detector 11a operates using the recovery clock shown in FIG. 1 as a clock CLK1 and using the clock signal having a phase opposite to the phase of the recovery clock as a clock CLK2.

The first flip-flop 211 holds the input signal in synchronization with the clock CLK1. The second flip-flop 212 holds the input signal in synchronization with the clock CLK2. The third flip-flop 213 holds the output of the first flip-flop 211 in synchronization with the clock CLK1. The latch 214 allows the value from the second flip-flop 212 input when the clock CLK1 is in a high level to pass through and maintains the output state of the timing when the clock CLK1 is switched from the high level to a low level while the clock CLK1 is in the low level. The first XOR circuit 215 outputs the exclusive OR of the output of the first flip-flop 211 and the output of the latch 214. The second XOR circuit 216 outputs the exclusive OR of the output of the third flip-flop 213 and the output of the latch 214. The first demultiplexer 217 converts serial data output from the first XOR circuit 215 into parallel data and outputs the parallel data. The second demultiplexer 218 converts serial data output from the second XOR circuit 216 into parallel data and outputs the parallel data. The first OR circuit 219 outputs the logical OR of the output of the first demultiplexer 217. The second OR circuit 220 outputs the logical OR of the output of the second demultiplexer 218. The first inverter 221 outputs the inverted value of the output of the first OR circuit 219. The second inverter 222 outputs the inverted value of the output of the second OR circuit 220. The first AND circuit 223 outputs the logical AND of the output of the first OR circuit 219 and the output of the second inverter 222. The output of the first AND circuit 223 becomes a first signal (e.g., DOWN1 signal that indicates that the phase is advanced and instructs to delay the phase). The second AND circuit 224 outputs the logical AND of the output of the first inverter 221 and the output of the second OR circuit 220. The output of the second AND circuit 224 becomes a second signal (e.g., an UP1 signal that indicates that the phase is delayed and instructs to advance the phase). The phase detector 11a outputs the output of the first inverter 221 as the recovery data.

When the timing when the input signal is changed is between rising of CLK1 and rising of CLK2, the phase detector 11a sets the DOWN1 signal to logic 0 (low level) and sets the UP1 signal to logic 1 (high level). Further, when the timing when the input signal is changed is between rising of CLK2 and rising of CLK1, the phase detector 11b sets the DOWN1 signal to logic 1 (high) and sets the UP1 signal to logic 0 (low).

The phase detector 11b shown in FIG. 3 is one example of a configuration when data of 3 Gbps is received by four-phase 1.5 GHz clock signals. The phase detector 11b shown in FIG. 3 includes flip-flops 231 to 236, latches 237 and 238, and a decoder 239. Further, the phase detector 11b operates using the recovery clock shown in FIG. 1 as the clock CLK1 and clock signals having phase differences from the recovery clock of 90 degrees, 180 degrees, and 270 degrees as clocks CLK2 to CLK4, respectively.

The flip-flop 231 holds the input signal in synchronization with the clock CLK1. The flip-flop 232 holds the input signal in synchronization with the clock CLK2. The flip-flop 233 holds the input signal in synchronization with the clock CLK3. The flip-flop 234 holds the input signal in synchronization with the clock CLK4. The flip-flop 235 holds the output of the flip-flop 231 in synchronization with the clock CLK1. The flip-flop 236 holds the output of the flip-flop 232 in synchronization with the clock CLK1. The latch 237 samples the output of the flip-flop 233 in the clock CLK1.

The latch 238 samples the output of the flip-flop 234 in the clock CLK1. The decoder 239 decodes the outputs of the flip-flops 235 and 236 and the latches 237 and 238 and outputs the first signal (e.g., DOWN1 signal) and the second signal (e.g., UP1 signal). In the phase detector 11b, the output of the flip-flop 231 and the output of the latch 237 are output as differential recovery data.

Next, an operation of the decoder 239 will be described. In the phase detector 11b, the input signal is sampled at rising edges of the four-phase clocks CLK1 to CLK4 whose phases are shifted from each other by 90 degrees by the four flip-flops 231 to 234 and the respective sampling results are sampled by the flip-flops 235 and 236 and the latches 237 and 238 in the clock CLK1. Then, when the adjacent sample signals are different from each other, the decoder 239 determines the phase delay or the phase advancement of the input data using this clock as the timing when the input signal changes, to thereby output the DOWN1 signal and the UP1 signal.

Next, an operation of the clock data recovery circuit 1 according to the first embodiment will be described. In the clock data recovery circuit 1 according to the first embodiment, the phase detector 11 extracts the recovery data from the input signal and detects the phase difference between the input signal and the recovery clock. In the clock data recovery circuit 1 according to the first embodiment, the loop filter 10 generates the phase control signal indicating the phase difference amount from the phase difference detected by the phase detector 11. Further, in the clock data recovery circuit 1 according to the first embodiment, the phase shifter 12 controls the phase of the recovery clock by the phase difference control signal so that the phase of the recovery clock is adjusted to the phase of the input signal.

Figure 4:
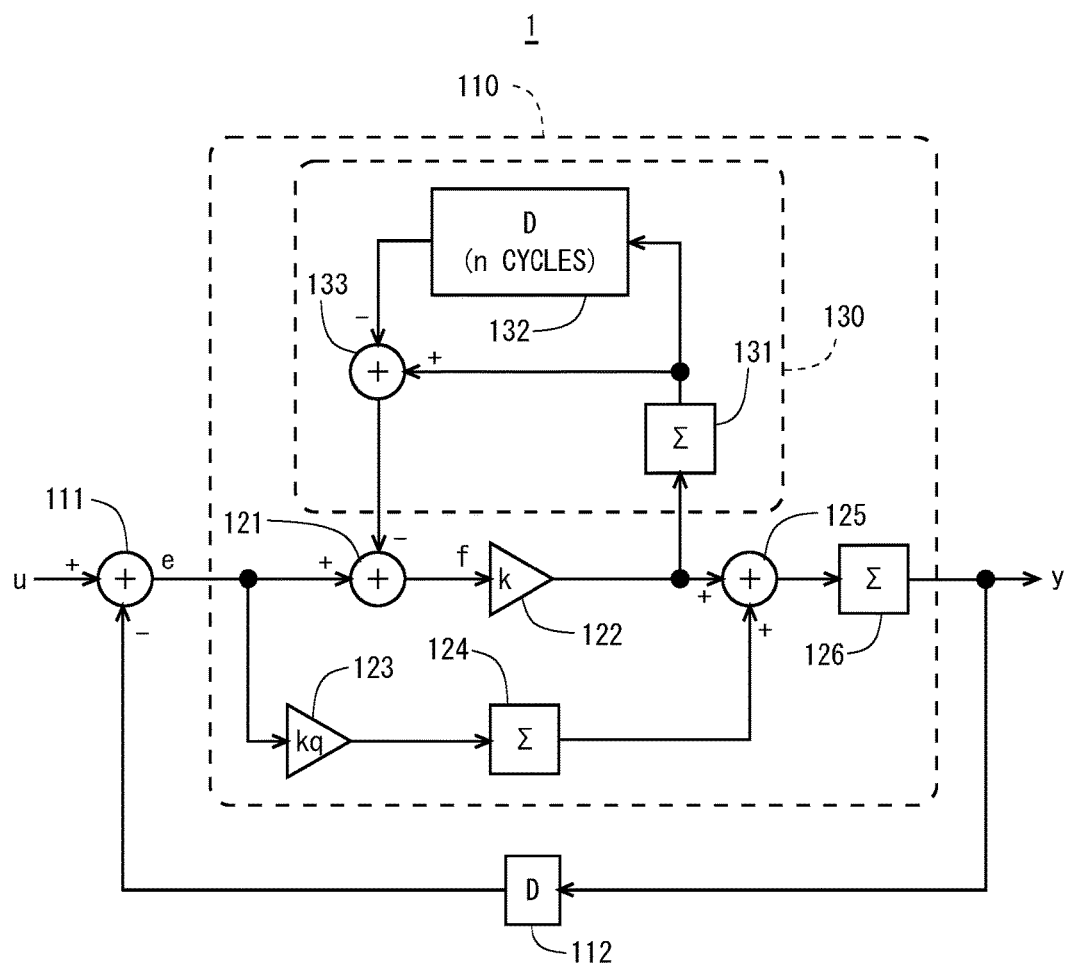
FIG. 4 is a block diagram of the clock data recovery circuit according to the first embodiment.

In the clock data recovery circuit 1 according to the first embodiment, the length of the locking time for the phase of the recovery clock and the phase of the input signal to become stable in a range of a predetermined phase difference, which is a locked state, is important. In the clock data recovery circuit 1 according to the first embodiment, the locking time is reduced by the arrangement of the loop filter 10. In the following description, the loop filter 10 will be described using a transfer characteristic of the loop filter 10. FIG. 4 shows a block diagram of the clock data recovery circuit 1 according to the first embodiment in which the processing of the specific block diagram shown in FIG. 1 is simplified.

As shown in FIG. 4, processing of the clock data recovery circuit 1 according to the first embodiment is expressed by a loop filter processing unit 110, a subtraction processing unit 111, and a delay processing unit 112. The loop filter processing unit 110 corresponds to the processing in the loop filter 10. The subtraction processing unit 111 corresponds to the processing in the phase detector 11. The delay processing unit 112 corresponds to the loop delay in the clock data recovery circuit 1.

Further, the loop filter processing unit 110 is expressed by a subtraction processing unit 121, an amplification processing unit 122, an amplification processing unit 123, an accumulation processing unit 124, an addition processing unit 125, an accumulation processing unit 126, and a compensation processing unit 130. The subtraction processing unit 121 corresponds to the processing in the subtractor 21. The amplification processing unit 122 corresponds to the processing in the amplifier 22. In the block diagram shown in FIG. 4, the amplification factor of the amplification processing unit 122 is a loop gain k, and k is obtained by the product of the amplification factor ki of the amplifier 22 and the amplification factor kc of the amplifier 33. The amplification processing unit 123 corresponds to the processing in the amplifier 23. The amplification factor of the amplification processing unit 123 corresponds to the product of the frequency tracking gain q and the loop gain k. This is because the feedback by the compensation processing unit 130 is given to only the first path. When the compensation processing unit 130 is not used, after the phase difference signal is amplified by the loop gain k, the obtained signal is amplified by the frequency tracking gain q. The accumulation processing unit 124 corresponds to the processing in the accumulator 24. The addition processing unit 125 corresponds to the processing in the adder 25. The accumulation processing unit 126 corresponds to the processing in the accumulator 26.

The compensation processing unit 130 corresponds to the processing in the compensator 30. In the block diagram shown in FIG. 4, processing of the amplifier 33 and the delay circuit 34 in the compensator 30 is not included in the compensation processing unit 130. This is because the amplification processing of the amplifier 33 is performed by the amplification processing unit 122. The compensation processing unit 130 includes an accumulation processing unit 131, a delay processing unit 132, and a subtraction processing unit 133. The accumulation processing unit 131 accumulates the output value (e.g., output value of the first path) of the amplification processing unit 122. The delay processing unit 132 delays the output value of the accumulation processing unit 131 by n cycles. The subtraction processing unit 133 outputs the difference between the output value of the accumulation processing unit 131 and the output value of the delay processing unit 132. That is, in the compensation processing unit 130, an integrated value of the output values of the first path for n cycles is output. In other words, the processing of the compensation processing unit 130 corresponds to the processing in the delay circuits 311 to 31n and the adders 321 to 32n of the compensator 30.

Next, in order to describe the clock data recovery circuit 1 according to the first embodiment in further detail, a first comparative example and a second comparative example will be described. The first comparative example is an example of a clock data recovery circuit that includes a loop filter that does not include the compensator 30 included in the clock data recovery circuit 1 according to the first embodiment. The second comparative example is an example of a clock data recovery circuit that performs a feedback control on the first path and the second path by a compensator.

Figure 5:
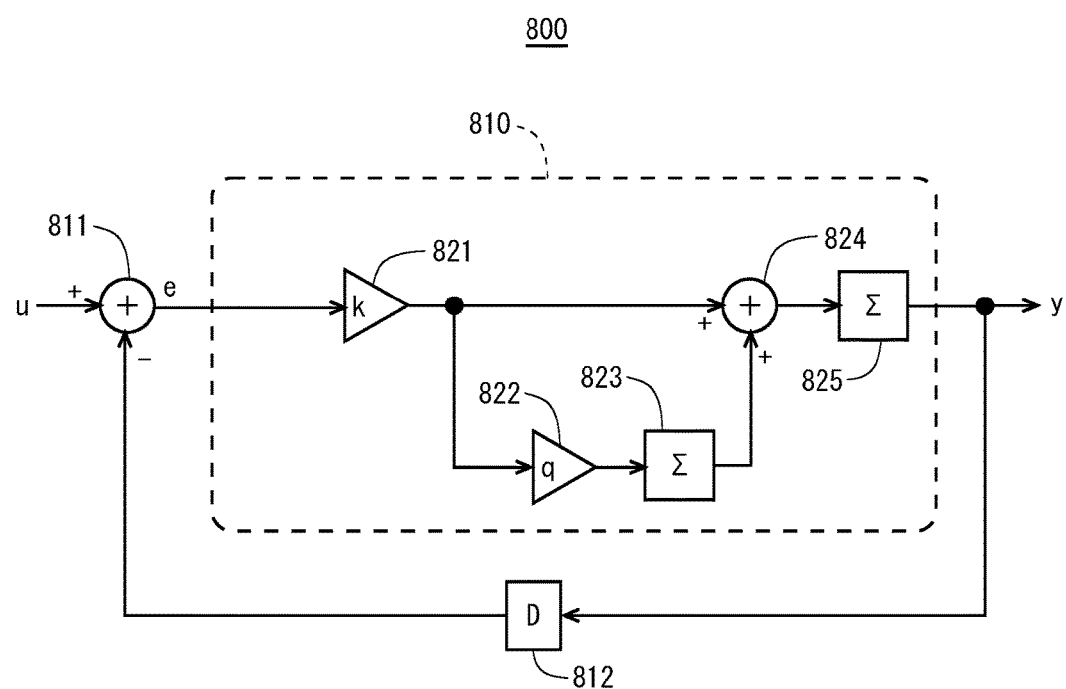
FIG. 5 is a block diagram of a clock data recovery circuit according to a first comparative example.

FIG. 5 shows a block diagram of a clock data recovery circuit 800 according to the first comparative example. As shown in FIG. 5, in the clock data recovery circuit 800 according to the first comparative example, an amplification processing unit 821 amplifies the phase difference signal e output from the subtraction processing unit 811 by the loop gain k. Further, in the clock data recovery circuit 800, the signal amplified by the amplification processing unit 821 is amplified by the frequency tracking gain q using an amplification processing unit 822. Then the signal amplified by the frequency tracking gain q is accumulated in an accumulation processing unit 823. After that, the clock data recovery circuit 800 adds the accumulated value of the accumulation processing unit 823 and the output value of the amplification processing unit 821 by an addition processing unit 824, accumulates the added value in an accumulation processing unit 825, to thereby generate the phase control signal. A delay processing unit 812 is a unit to indicate the loop delay.

Figure 6:
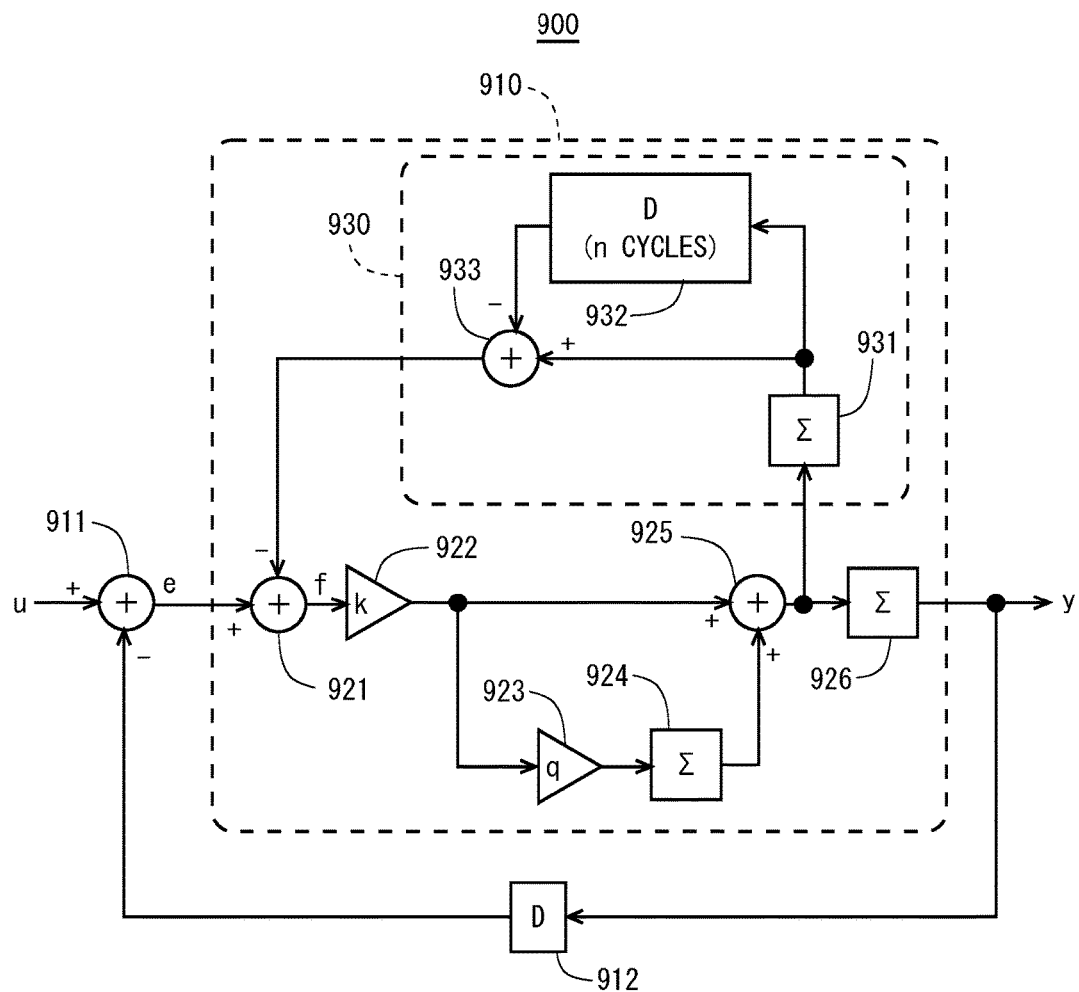
FIG. 6 is a block diagram of a clock data recovery circuit according to a second comparative example.

FIG. 6 shows a block diagram of a clock data recovery circuit 900 according to a second comparative example. As shown in FIG. 6, the clock data recovery circuit 900 according to the second comparative example is obtained by adding a loop filter processing unit 930 and a subtraction processing unit 921 to the clock data recovery circuit 800 according to the first comparative example. That is, a subtraction processing unit 911, a delay processing unit 912, an amplification processing unit 922, an amplification processing unit 923, an accumulation processing unit 924, an addition processing unit 925, and an accumulation processing unit 926 respectively correspond to the subtraction processing unit 811, the delay processing unit 812, the amplification processing unit 821, the amplification processing unit 822, the accumulation processing unit 823, the addition processing unit 824, and the accumulation processing unit 825.

In the clock data recovery circuit 900, the loop filter processing unit 930 generates a value to be fed back based on an output value of the addition processing unit 925 and the subtraction processing unit 921 subtracts an output value of the loop filter processing unit 930 from the value of the phase difference signal output from the subtraction processing unit 911. The loop filter processing unit 930 includes an accumulation unit 931, a delay processing unit 932, and a subtraction processing unit 933. The loop filter processing unit 930 outputs the accumulated value of output values of the addition processing unit 925 for n cycles.

Next, with reference to a difference in the operations of the clock data recovery circuit 1 according to the first embodiment and the clock data recovery circuits according to the first and second comparative examples, an operation of the clock data recovery circuit 1 will be described. In the clock data recovery circuit, a convergence with respect to a phase step input in which the phase of the input signal changes in a stepped manner and a tracking performance with respect to a phase ramp input in which the phase of the input signal changes in a ramp manner are important characteristics. The phase step input is greatly related to the locking time in the locking operation that locks the phase of the recovery clock to the phase of the input signal when the operation of the clock data recovery circuit is started.

Figure 7:
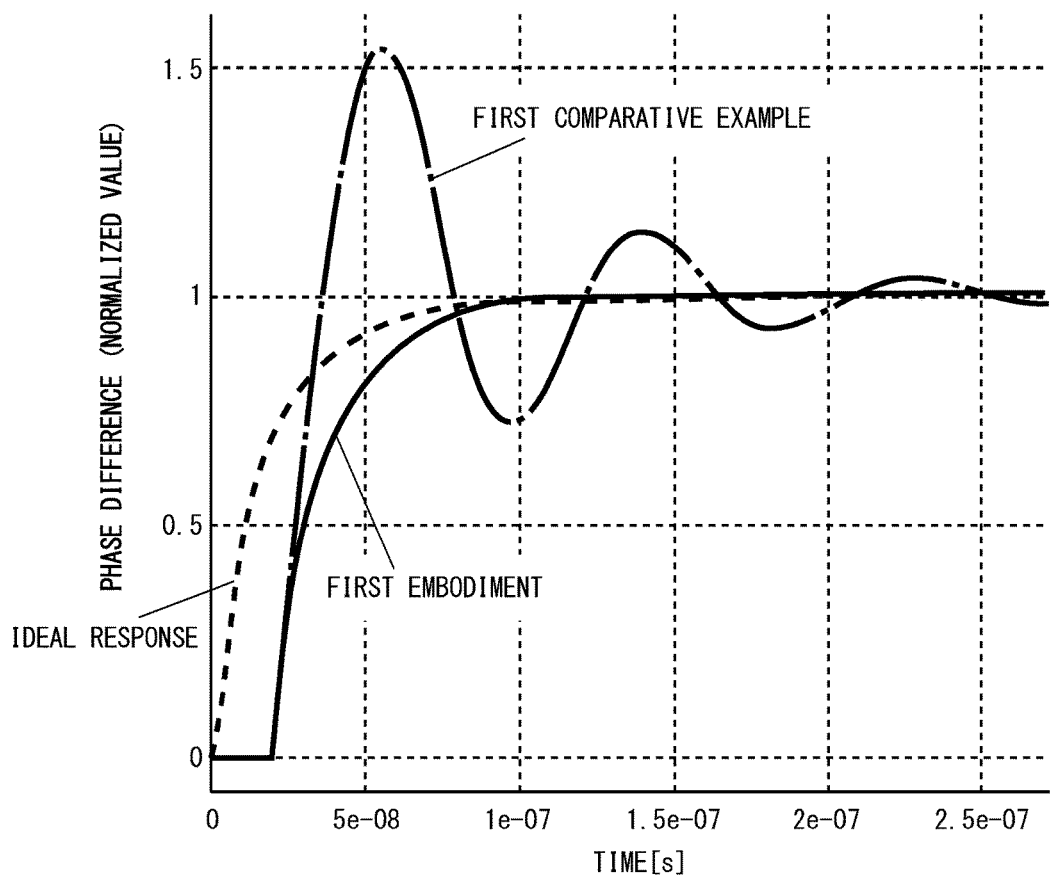
FIG. 7 is a graph for describing a difference in convergence of a phase difference between the clock data recovery circuit according to the first embodiment and the clock data recovery circuit according to the first comparative example.

First, the convergence with respect to the phase step input will be described using a graph. FIG. 7 shows a graph for describing a difference in the convergence of the phase difference between the clock data recovery circuit according to the first embodiment and the clock data recovery circuit according to the first comparative example. The graph shown in FIG. 7 shows a response output of the clock data recovery circuit with respect to the phase step input (phase of the recovery clock). In the graph shown in FIG. 7, the horizontal axis indicates time and the vertical axis indicates a value obtained by normalizing the phase difference. Further, in FIG. 7, a state in which the latency in the loop filter is zero is an ideal response. As shown in FIG. 7, in the ideal response, the phase difference asymptotically becomes zero. On the other hand, in the clock data recovery circuit 1 according to the first embodiment, although the delay corresponding to the latency of the loop filter 10 occurs, the response becomes close to the ideal response. On the other hand, in the first comparative example, an overshoot and oscillations appear due to the magnitude of the loop gain, which means it takes time for the convergence.

Figure 8:
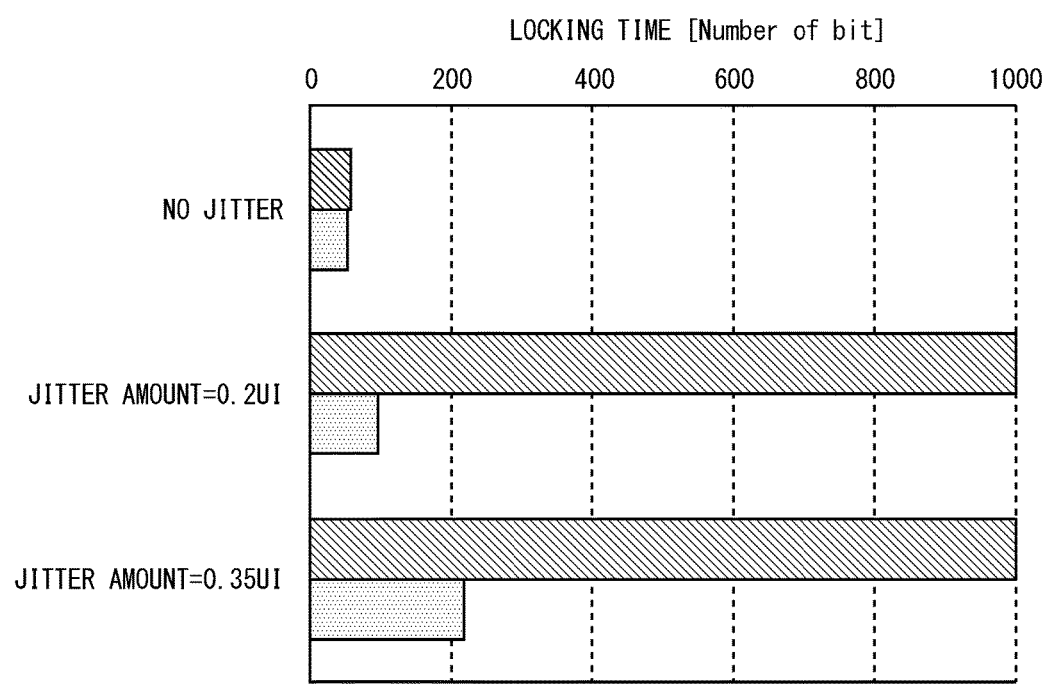
FIG. 8 is a graph for describing a difference in locking time between the clock data recovery circuit according to the first embodiment and the clock data recovery circuit according to the first comparative example.

Next, FIG. 8 shows a graph for describing a difference in the locking time between the clock data recovery circuit according to the first embodiment and the clock data recovery circuit according to the first comparative example. In the example shown in FIG. 8, a symbol bit number given as the input signal is used as a unit of time. As shown in FIG. 8, when there is no jitter in the input signal, the state of the clock data recovery circuits becomes the locked state in a short period of time both in the clock data recovery circuit according to the first comparative example and the clock data recovery circuit 1 according to the first embodiment. When the jitter increases, the state of the clock data recovery circuit does not become the locked state even after 1000 bits are input in the first comparative example. On the other hand, in the clock data recovery circuit 1 according to the first embodiment, the state of the circuit becomes the locked state in 92 bits when the amount of jitter is 0.2 UI and in 221 bits when the amount of jitter is 0.35 UI.

Next, the convergence with respect to the phase step input and the tracking performance with respect to the phase ramp input will be described using the transfer characteristics of the clock data recovery circuits according to the first and second comparative examples and the clock data recovery circuit 1 according to the first embodiment. In the following description, k denotes the loop gain, q denotes the frequency tracking gain, u denotes the phase of the input signal, y denotes the phase of the recovery clock, e denotes the phase difference, and D denotes the loop delay time of the clock data recovery circuit 1.

First, the transfer characteristic of the clock data recovery circuit 800 according to the first comparative example will be described. An open-loop transfer function L(s) of the clock data recovery circuit 800 according to the first comparative example can be expressed by Expression (1).

$$L(s) = \frac{y(s)}{e(s)} = k\left(1 + \frac{q}{s}\right)\frac{1}{s} \qquad (1)$$

Further, a closed-loop transfer function H(s) of the clock data recovery circuit 800 according to the first comparative example can be expressed by Expression (2).

$$H(s) = \frac{y(s)D(s)}{u(s)} = \frac{L(s)D(s)}{1 + L(s)D(s)} \qquad (2)$$

Here, D(s) indicates the loop delay time of the clock data recovery circuit 800 and is expressed by Expression (3). This loop delay time D(s) delays the phase of the recovery clock by D.

$$D(s) = e^{-sD} \qquad (3)$$

From the above Expressions (1) to (3), in the clock data recovery circuit 800 according to the first embodiment, when the phase of the recovery clock is delayed from the input signal by 90 degrees or more, the loop of the clock data recovery circuit becomes a positive feedback. Therefore, it will be understood that, when the frequency of the input signal is this frequency, if the absolute value of the open-loop transfer function L(s) is close to 1, the denominator of the closed-loop transfer function H(s) becomes close to 0 and the jitter is amplified. That is, when there is a phase ramp input, in the clock data recovery circuit 800 according to the first comparative example, if the phase difference between the input signal and the recovery clock is 90 degrees or larger, the jitter becomes large and it is impossible to track the change in phases. Further, when the input signal is a phase step input, the response becomes unstable in which an overshoot and oscillations occur as shown in the graph according to the first comparative example shown in FIG. 7.

Next, the transfer characteristic of the clock data recovery circuit 900 according to the second comparative example will be described. An open-loop transfer function Ls (s) of the clock data recovery circuit 900 according to the second comparative example can be expressed by Expression (4).

$$Ls(s) = \frac{y(s)}{e(s)} = \frac{L(s)}{1 + L(s)(1-D)} \qquad (4)$$

Further, a closed-loop transfer function Hs(s) of the clock data recovery circuit 900 according to the second comparative example can be expressed by Expression (5).

$$Hs(s) = \frac{y(s)D(s)}{u(s)} = \frac{Ls(s)D(s)}{1 + Ls(s)D(s)} = \frac{L(s)D(s)}{1 + L(s)} \qquad (5)$$

From Expression (5), it will be understood that, since the loop delay time D (s) is removed from the denominator of the closed-loop transfer function Hs(s) in the clock data recovery circuit 900 according to the second comparative example, the loop is stable with respect to the phase step input.

There is a problem, however, in the clock data recovery circuit 900 according to the second comparative example that it cannot track the phase ramp input. The phase error with respect to the phase ramp input of the closed-loop transfer function Hs (s) increases with time. A transfer function Es(s) of the phase error with respect to the phase ramp input can be expressed by Expression (6).

$$Es(s) = \frac{e(s)}{u(s)} = 1 - Hs(s) \qquad (6)$$

The value of the transfer function after an elapse of a long period of time with respect to the phase ramp input does not converge as shown in Expression (7).

$$\lim_{s \to 0} \frac{1}{s} Es(s) \sim \lim_{s \to 0} \frac{kq(1-D(s))}{s^3} = \infty \qquad (7)$$

That is, in the clock data recovery circuit 900 according to the second comparative example, when there is a difference between the frequency of the clock superimposed on the input signal and the frequency of the recovery clock, the phase error does not converge.

Next, the transfer characteristic of the clock data recovery circuit 1 according to the first embodiment will be described. An open-loop transfer function Lp(s) of the clock data recovery circuit 1 according to the first embodiment is expressed by Expression (8).

$$Lp(s) = \frac{y(s)}{e(s)} = \frac{kq}{s^2} + \frac{k}{s} \cdot \frac{1}{1 + \frac{k}{s}(1-D)} \qquad (8)$$

Further, a closed-loop transfer characteristic Hp(s) of the clock data recovery circuit 1 according to the first embodiment can be expressed by Expression (9).

$$Hp(s) = \qquad (9)$$

$$\frac{y(s)D(s)}{u(s)} = \frac{Lp(s)D(s)}{1 + Lp(s)D(s)} = \frac{\frac{k}{s} + \frac{kq}{s^2} + \frac{k^2q}{s^3}(1-D(s))}{1 + \frac{k}{s} + \frac{kq}{s^2}D(s) + \frac{k^2q}{s^3}(1-D(s))}$$

Since an area in which a jitter frequency of the input signal is high is an area in which s is large, the item including D(s) can be negligible. That is, in the area in which the jitter frequency of the input signal is high, Expression (9) can be expressed by Expression (10).

$$Hp(s) = \frac{\frac{k}{s}}{1 + \frac{k}{s}} \qquad (10)$$

That is, in the clock data recovery circuit 1 according to the first embodiment, the item of the loop delay time D(s) can be ignored, whereby it is possible to make the loop stable with respect to the phase ramp input, similar to the clock data recovery circuit 900 according to the second comparative example.

Further, a phase error Ep(s) can be expressed by Expression (11).

$$Ep(s) = \frac{e(s)}{u(s)} = 1 - Hp(s) \qquad (11)$$

In Expression (4), the response of the phase ramp input can be expressed by Expression (12).

$$\lim_{s \to 0} \frac{1}{s} Ep(s) = 0 \qquad (12)$$

That is, it will be understood that, in the clock data recovery circuit 1 according to the first embodiment, the phase error becomes zero after an elapse of a long period of time, whereby it is possible to ensure a high tracking performance with respect to the phase ramp input.

From the above description, the clock data recovery circuit 1 according to the first embodiment performs the feedback control by the compensator 30 only for the first path. The clock data recovery circuit 1 according to the first embodiment is therefore able to reduce time required for the phase of the recovery clock to be the locked state and to enhance the tracking performance of the phase of the recovery clock with respect to the input signal.

While the clock data recovery circuit is mounted on a reception circuit of the serial data communication, the clock data recovery circuit is frequently switched on/off in order to reduce power consumption. Therefore, a reduction in the locking time greatly affects the start-up time of the system. The clock data recovery circuit 1 according to the first embodiment is highly effective as it is possible to reduce the locking time required for the phase of the recovery clock to be adjusted to the phase of the input signal.

Further, in the serial data communication, in order to reduce unwanted radiations, a clock superimposed on serial data to be transmitted may be subjected to frequency dispersion processing such as spread spectrum processing. In order to maintain the locked state with respect to the input signal subjected to the frequency dispersion processing, the tracking performance with respect to the phase ramp input needs to be high. In the clock data recovery circuit 1 according to the first embodiment, the tracking performance with respect to the phase ramp input is high, whereby it is possible to obtain a high effect especially in the reception circuit in the serial data communication.

Further, the clock data recovery circuit 1 according to the first embodiment uses the phase detector that indicates the phase difference by a binary value as the phase detector 11. When such a phase detector is used, it is possible to reduce the size of the circuit since the phase detector can be composed of a digital circuit. However, when such a phase detector is used, if the jitter of the input signal is large, the output of the phase detector does not become stable and the phase of the recovery clock may not converge. However, in the clock data recovery circuit 1 according to the first embodiment, even when the phase detector that indicates the phase difference by the binary value is used as the phase detector 11, the convergence of the phase of the recovery clock can be accelerated.

Now, the difference between the circuit according to the present invention and the PLL circuit disclosed in Japanese Unexamined Patent Application Publication No. 2001-202721 will be described in further detail. In the PLL circuit disclosed in Japanese Unexamined Patent Application Publication No. 2001-202721, a loop latency compensation based on the Smith method is performed for the loop filter. In this loop latency compensation, even the latency outside the loop filter can be compensated. However, in the PLL circuit disclosed in Japanese Unexamined Patent Application Publication No. 2001-202721, a calculation of a correction path to deal with the phase ramp input is complicated and a correction needs to be performed by a numerically controlled oscillator or an analog circuit in terms of the accuracy. Since the size of the circuit increases in the PLL circuit disclosed in Japanese Unexamined Patent Application Publication No. 2001-202721, it is difficult to apply this PLL circuit to the clock data recovery circuit.

On the other hand, in the clock data recovery circuit 1 according to the first embodiment, the loop filter can be formed of a DSP or of a digital circuit. That is, the clock data recovery circuit 1 according to the first embodiment is the most suitable as the clock data recovery circuit since it can be formed of a small circuit.

Second Embodiment

Figure 9:
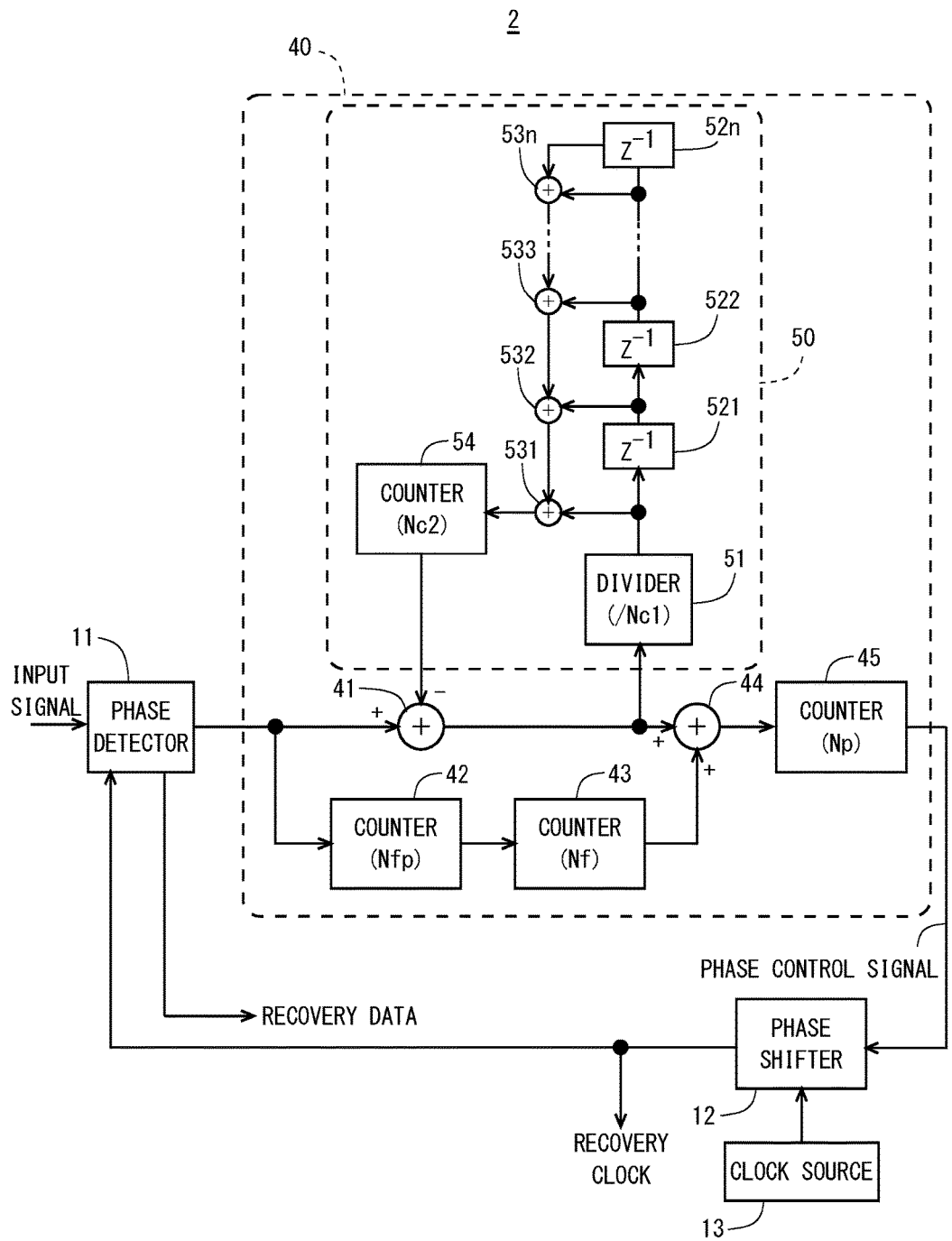
FIG. 9 is a specific block diagram of the clock data recovery circuit according to the second embodiment.

A clock data recovery circuit 2 according to a second embodiment is an example in which a loop filter 40 composed of a counter is used in place of the loop filter 10. FIG. 9 shows a block diagram of the clock data recovery circuit 2 according to the second embodiment.

As shown in FIG. 9, the loop filter 40 according to the second embodiment includes a subtractor 41, a second counter (counter 42), a third counter (e.g., counter 43), an adder 44, a fourth counter (counter 45), and a compensator 50. Further, the compensator 50 includes a divider 51, delay circuits 521 to 52n, adders 531 to 53n, and a first counter (e.g., counter 54). In the loop filter 40, the subtractor 41 is arranged on the first path and the loop gain set in the first path is determined by a division factor Nc1 of the divider 51 and a maximum count value Nc2 of the counter 54. The gain of the first path is 1/Nc1*1/Nc2. Further, in the loop filter 40, the counter 42 and the counter 43 are arranged on the second path and the product of the frequency tracking gain q and the loop gain k is determined by a maximum count value Nfp of the counter 42. The gain of the second path is 1/Nfp.

The subtractor 41 outputs a value obtained by subtracting the output value of the counter 54 in the compensator 50 from the phase difference signal output from the phase detector 11. The counter 42 accumulates the phase difference indicated by the phase difference signal with a second value (e.g., maximum count value Nfp) as a maximum value. The counter 43 accumulates the output value of the counter 42 with a third value (e.g., maximum count value Nf) as a maximum value. The adder 44 adds the output value of the counter 43 and the output value of the subtractor 41. The counter 45 accumulates the output value of the adder 44 with a fourth value (e.g., maximum count value Np) as a maximum value and outputs the accumulated value as the phase control signal.

The divider 51 divides the output value of the first path by a predetermined factor (e.g., division factor Nc1). The delay circuits 521 to 52n and the adders 531 to 53n constitute a first accumulator that accumulates the output values of the first path for n cycles (in the second embodiment, output value of the divider 51). The counter 54 accumulates the output value of the first accumulator with a first value (maximum count value Nc2) as a maximum value.

In the loop filter 40 according to the second embodiment, the output of each counter may be considered to be a value obtained by dividing the count value of each counter by the maximum count value of each counter.

As described above, by constituting the loop filter 40 using the counter, the number of registers and the number of bits of operators are smaller than those in the case in which fixed point calculation or the like is used, whereby a high-speed operation can be performed. Further, in the loop filter 40 according to the fourth embodiment, the divider 51 is provided on the input of the compensator 50. Accordingly, in the loop filter 40 according to the fourth embodiment, it is possible to reduce the number of bits of the circuit provided in the feedback system and to reduce the size of the circuit.

Third Embodiment

Figure 10:
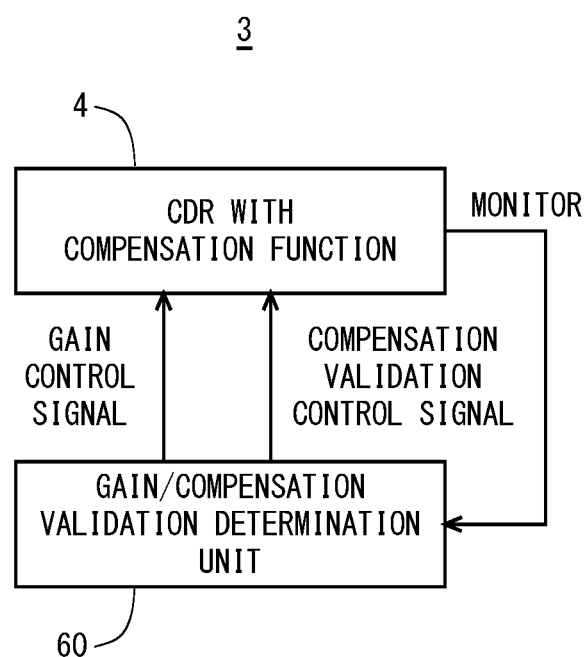
FIG. 10 is a block diagram of a clock data recovery circuit according to a third embodiment.

In a third embodiment, a clock data recovery circuit 3 to which a function of changing the filter gain and a function of switching valid/invalid of the compensator 50 are added to the clock data recovery circuit 2 according to the second embodiment will be described. FIG. 10 shows a block diagram of the clock data recovery circuit 3 according to the third embodiment.

As shown in FIG. 10, the clock data recovery circuit 3 according to the third embodiment includes a clock data recovery circuit 4 and a control circuit (e.g., gain/compensation validation determination unit 60). The gain/compensation validation determination unit 60 acquires the phase difference indicated by the phase difference signal in the clock data recovery circuit 4, the output of the lock determination unit, and the output of the counter that measures a predetermined period as monitor signals, and switches valid/invalid of the loop gain and the compensator 50 of the clock data recovery circuit 4 when the state of the clock data recovery circuit 4 has been changed to the locked state. This switching is performed by the gain/compensation validation determination unit 60 outputting the gain control signal and the compensation validation control signal.

Figure 11:
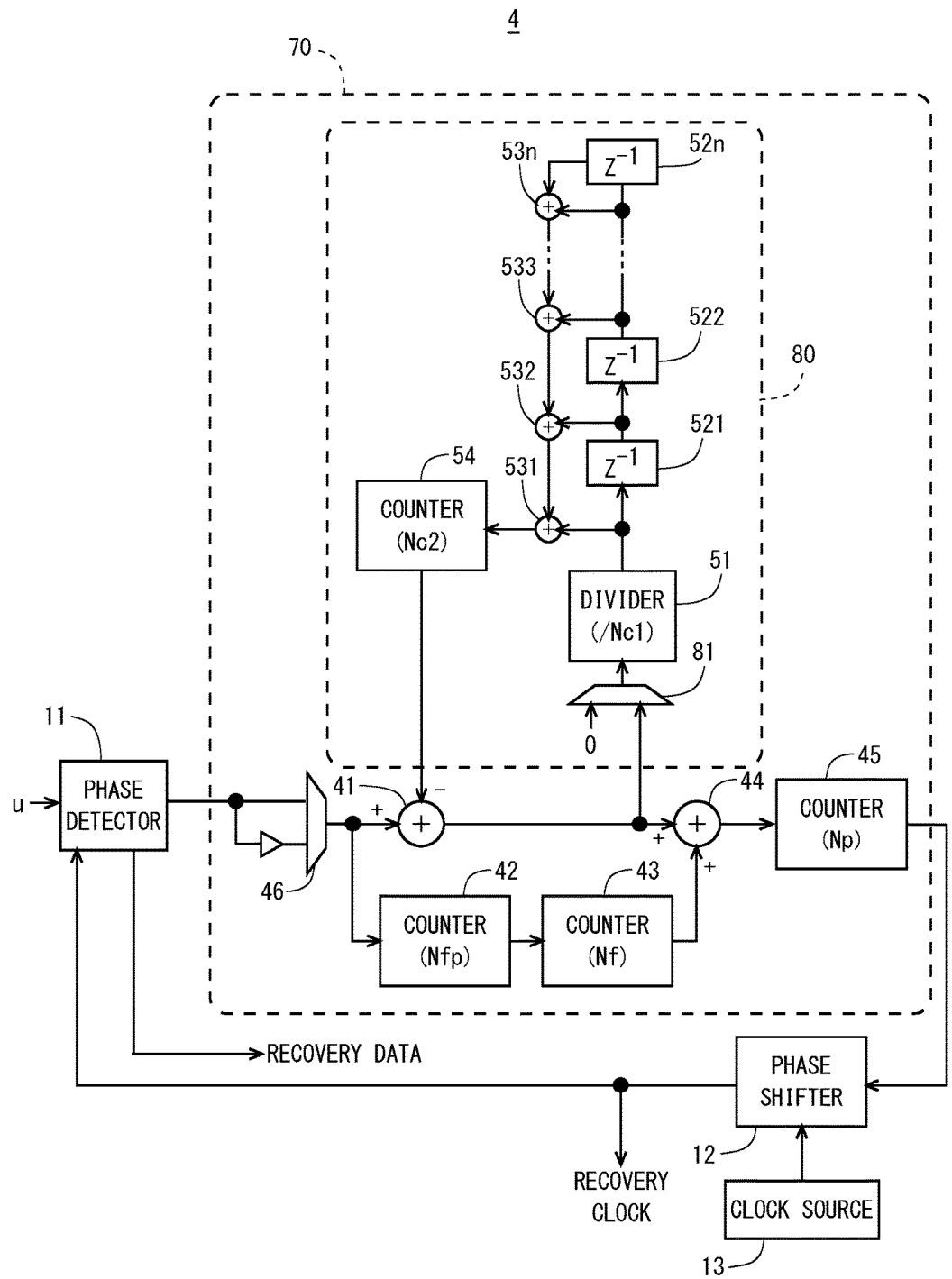
FIG. 11 is a specific block diagram of the clock data recovery circuit according to the third embodiment.

Next, FIG. 11 shows a block diagram of the clock data recovery circuit 4 according to the fourth embodiment. As shown in FIG. 11, the clock data recovery circuit 4 according to the fourth embodiment includes a loop filter 70 in which a first selector (e.g., selector 46) and an amplifier are added to the loop filter 40 according to the third embodiment and the compensator 50 is replaced by a compensator 80. Further, the compensator 80 is obtained by adding a second selector (e.g., selector 81) to the compensator 50.

The selector 46 is arranged in the previous stage of the subtractor 41 and the counter 42. The selector 46 receives the phase difference signal output from the phase detector 11 and the amplified phase difference signal obtained by amplifying the phase difference signal by the amplifier. The selector 46 selects one of two signals input according to the gain control signal output from the gain/compensation validation determination unit 60 and outputs the selected signal.

The selector 81 selects one of an invalid value (e.g., 0) that invalidates the compensator 80 and the output value of the first path and outputs the selected signal to the divider 51. The selector 81 selects one of the two signals input according to the compensation validation control signal output from the gain/compensation validation determination unit 60 and outputs the selected signal.

Now, a specific control method of the selector 46 and the selector 81 in the gain/compensation validation determination unit 60 will be described. The gain/compensation validation determination unit 60 causes the selector 46 to select the amplified phase difference signal and causes the selector 81 to select the output value of the first path when the clock data recovery circuit 4 is in a non-locked state. On the other hand, the gain/compensation validation determination unit 60 causes the selector 46 to select the phase difference signal output from the phase detector 11 and causes the selector 81 to select the invalid value when the clock data recovery circuit 4 is in the locked state.

From the above description, in the clock data recovery circuit 3 according to the third embodiment, it is possible to increase the locking speed by increasing the filter gain in the phase locking operation and to increase the interruption performance of the input jitter by decreasing the filter gain after the completion of the phase locking operation. In the clock data recovery circuit 3 according to the third embodiment, even when the filter gain is increased, the compensator 80 is valid, whereby it is possible to make the loop stable.

Further, in the clock data recovery circuit 3 according to the third embodiment, the compensator 80 is invalidated after the completion of the locking operation, whereby it is possible to reduce the power consumption.

Further, in the clock data recovery circuit 3 according to the third embodiment, only one of the gain control and the valid/invalid switch control of the compensator may be performed.

The first to third embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A clock data recovery circuit comprising:
   a phase detector that detects a phase difference between a recovery clock and an input signal and outputs a phase difference signal indicating the phase difference;
   a loop filter that generates a phase control signal based on the phase difference signal; and
   a phase shifter that controls a phase of the recovery clock based on the phase control signal, wherein the loop filter comprises:
   a first path that has an input side to which the phase difference signal is input, determines a loop gain that sets a speed of adjusting the phase of the recovery clock to the phase of the input signal, and has an output side from which a first output value is output,
   a subtractor that is provided on the input side on the first path and receives the phase difference signal as one input;
   a second path that receives the phase difference signal and determines a frequency tracking gain that sets a speed of adjusting a frequency of the recovery clock to a frequency of the input signal; and
   a compensator that gives a negative feedback from the output side to the input side of the first path by giving an output to another input of the subtractor on the first path and compensates for a phase delay of an output of the phase detector due to a delay amount of the loop filter.

2. The clock data recovery circuit according to claim 1, wherein:
   the compensator outputs a first accumulated value obtained by accumulating output values of the first path for n cycles before a present time;
   the first path outputs a value obtained by amplifying a difference between the phase difference and the first accumulated value by a first amplification factor,
   the second path outputs a second accumulated value in which a value obtained by amplifying the phase difference by a second amplification factor is accumulated, and
   the loop filter outputs a value obtained by accumulating a value in which the output value of the first path and the second accumulated value are added as the phase control signal.

3. The clock data recovery circuit according to claim 1, wherein the phase detector outputs a first signal and a second signal as the phase difference signal, the first signal being a binary signal and expressing a phase advancement and the second signal being a binary signal and expressing a phase delay.

4. The clock data recovery circuit according to claim 3, wherein:
   the compensator comprises a divider that divides the output value of the first path by a predetermined factor, a first accumulator that accumulates an output value of the divider, and a first counter that accumulates an output value of the first accumulator with a first value as a maximum value,
   the first path comprises a subtractor that outputs a value obtained by subtracting an output value of the first counter from the phase difference,
   the second path comprises a second counter that accumulates the phase difference with a second value as a maximum value and a third counter that accumulates an output value of the second counter with a third value as a maximum value, and the loop filter comprises an adder that adds an output value of the third counter and an output value of the subtractor and a fourth counter that accumulates an output value of the adder with a fourth value as a maximum value and outputs the accumulated value as the phase control signal.

5. The clock data recovery circuit according to claim 4, wherein:
the loop filter further comprises a first selector that selects one of the phase difference and an amplified phase difference obtained by amplifying the phase difference by a predetermined amplification factor and supplies the selected one to the subtractor and the second counter,
the compensator further comprises a second selector that selects one of an invalid value that invalidates the compensator and the output value of the first path and outputs the selected one to the divider, and
the clock data recovery circuit further comprises a control circuit that causes the first selector to select the amplified phase difference and causes the second selector to select the output value of the first path when the clock data recovery circuit is a non-locked state.

6. A clock data recovery circuit comprising:
a phase detector that detects a phase difference between a recovery clock and an input signal and outputs a phase difference signal indicating the phase difference;
a loop filter that generates a phase control signal based on the phase difference signal;
a phase shifter that controls a phase of the recovery clock based on the phase control signal, wherein the loop filter comprises:
a first path at least comprising a first subtractor having one input on the path to which the phase difference signal is input;
a second path that receives the phase difference signal and is provided in parallel with the first path;
an adder that adds a first output value output from the first path and a second output value output from the second path and outputs the obtained value; and
a compensator that is connected between an output node of the first path from which the first output value is output and another input of the first subtractor and forms a feedback path for the first path.

7. The clock data recovery circuit according to claim 6, wherein:
the compensator comprises:
a first accumulator that accumulates the first output value and outputs a preliminary accumulated value;
an amplifier in the compensator that amplifies the preliminary accumulated value to generate the first output value; and
a delay circuit that holds the first accumulated value,
the first path comprises a first amplifier that is provided subsequent to the subtractor and outputs the first output value, and
the second path comprises:
a second amplifier that amplifies the phase difference signal; and
a second accumulator that accumulates an output value of the second amplifier and outputs the second output value.

8. The clock data recovery circuit according to claim 6, wherein:
the compensator comprises:
a divider that divides an output value of the first path by a predetermined factor;
a first accumulator that accumulates an output value of the divider; and
a first counter that accumulates an output value of the first accumulator with a first value as a maximum value,
the second path comprises:
a second counter that accumulates the phase difference with a second value as a maximum value; and
a third counter that accumulates an output value of the second counter with a third value as a maximum value, and
the loop filter comprises:
an adder that adds an output value of the third counter and an output value of the subtractor; and
a fourth counter that accumulates an output value of the adder with a fourth value as a maximum value and outputs the accumulated value as the phase control signal.

9. The clock data recovery circuit according to claim 8, wherein:
the loop filter further comprises a first selector that selects one of the phase difference and an amplified phase difference obtained by amplifying the phase difference by a predetermined amplification factor and supplies the selected one to the subtractor and the second counter,
the compensator further comprises a second selector that selects one of an invalid value that invalidates the compensator and the output value of the first path and outputs the selected one to the divider, and
the clock data recovery circuit further comprises a control circuit that causes the first selector to select the amplified phase difference and causes the second selector to select the output value of the first path when the clock data recovery circuit is a non-locked state.

* * * * *